July 31, 1923.
E. D. SWAN ET AL
1,463,731
SHEAVE BLOCK
Filed April 23, 1921
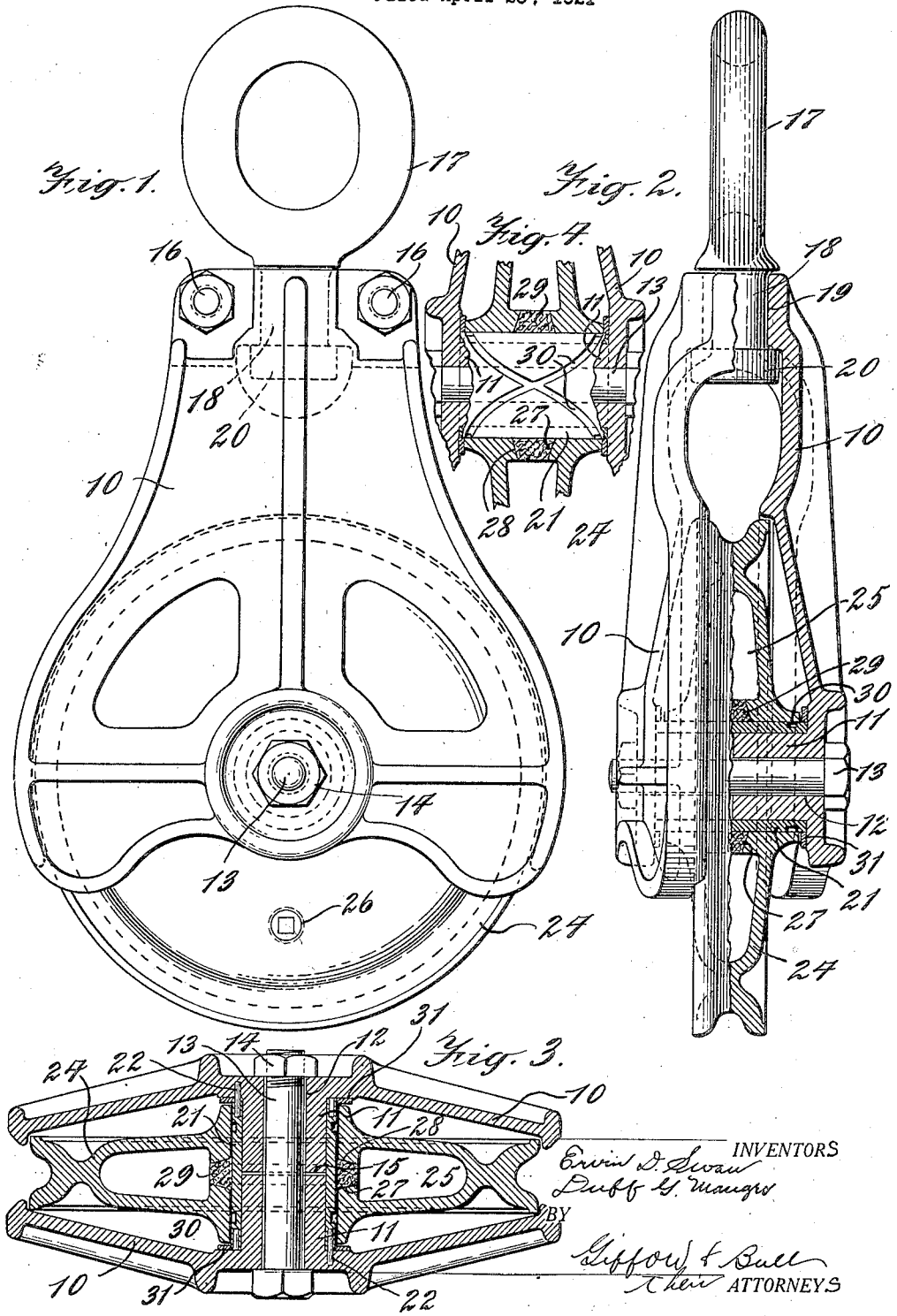
INVENTORS
Erwin D. Swan
Duff G. Mangro
BY
Gifford & Bull
Their ATTORNEYS Patented July 31, 1923.

1,463,731

UNITED STATES PATENT OFFICE.

ERVIN D. SWAN, OF EAST ORANGE, NEW JERSEY, AND DUFF G. MANGES, OF MARYVILLE, TENNESSEE, ASSIGNORS, BY DIRECT AND MESNE ASSIGNMENTS, OF ONE-HALF TO LIDGERWOOD MANUFACTURING COMPANY, OF NEW YORK, N. Y., A CORPORATION OF NEW YORK, AND ONE-HALF TO UNITED STEEL BLOCK CORPORATION, OF CHESTER, PENNSYLVANIA, A CORPORATION OF DELAWARE.

SHEAVE BLOCK.

Application filed April 23, 1921. Serial No. 463,760.

*To all whom it may concern:*

Be it known that we, ERVIN D. SWAN and DUFF G. MANGES, citizens of the United States, and residents of East Orange, in the county of Essex and State of New Jersey, and Maryville, in the county of Blount and State of Tennessee, respectively, have invented certain new and useful Improvements in Sheave Blocks, of which the following is a specification.

Our invention more particularly relates to a sheave block in which provision is made for continuously and effectively lubricating the bearing surface for the sheave and filtering the lubricant.

Our invention will best be understood by reference to the accompanying drawings, in which Figure 1 is a side view of a sheave block embodying our invention; Fig. 2 is an end view partially broken away; Fig. 3 is a cross section taken through the axis of the bearing in Fig. 1, and Fig. 4 is a fragmentary longitudinal section taken axially through the bearing member and broken away to show the bearing sleeve in elevation.

Like reference characters indicate like parts throughout the drawings.

Referring, now, to the drawings, we have illustrated our invention in a sheave block in which the frame comprises two side plates 10 which are preferably provided with inwardly extending registering hub members 11, as best shown in Fig. 3. The hub members are provided with a central opening 12 in which is received a retaining bolt 13 provided with a clamping nut 14. A clearance space 15 is preferably provided between the hub members 11, as shown in Fig. 3. The upper ends of the plates 10 may be clamped together by bolts 16, as best shown in Fig. 1. The frame of the sheave block is supported by means of a swivel eye 17, the shank 18 of which is received in a socket 19 formed in the plates 10 in a known manner, the lower end of the shank being provided with a supporting head 20.

The hub members 11 are preferably surrounded by a bearing sleeve 21 made of antifriction metal, such as bronze. The sleeve 21 is fixed in position around the hub by means of pins 22, the ends of which are received in registering openings in the ends of the sleeve 21 and in the plates 10, respectively, the sleeve at the same time serving as a spacing member for the side plates 10.

A sheave 24 is provided with a central cylindrical bearing aperture surrounding the sleeve 21, as best shown in Fig. 3, and is provided with a chamber 25, preferably annular, for the reception of a lubricating material, such as oil, which may be introduced through an opening 26 (see Fig. 1). The chamber 25 communicates with the bearing 21 by means of a passage 27, preferably annular, and preferably bevelled inwardly towards the bearing member, as at 28. A pad or ring 29 of felt or other fibrous yielding material is located in the passage 27 between the chamber 25 and the bearing. This ring is preferably formed originally with a rectangular cross section and of a width corresponding to the greatest width of the passage 27. The ring so formed is compressed within the passage 27 and when so compressed, and formed of a resilient material as described, the ring tends to bulge inwardly towards the bearing member 21 and thereby make good contact therewith. It will be understood that when the sheave is rotating rapidly there will be a tendency to throw the lubricating material by centrifugal force outwardly away from the felt ring. When the speed of the sheave, however, is reduced, or when it stops altogether, the ring will then come into engagement with the lubricating material and will retain a sufficient amount thereof to provide for continuous lubrication while the sheave is in operation, and during such periods as the lubricating material may be out of contact with the ring.

The lubricating material is preferably spread from the central portion of the bearing member 21 where the same is applied uniformly over the bearing member by means of curved grooves 30 extending from points near the ends of the bearing member 21 towards the center and preferably crossing each other on either side of the member, as indicated in Fig. 4. The ring 29, because of the tendency to bulge inwardly in the manner described, maintains good contact with the bearing member, and, at the same time, coacts with the grooves to force the lubricating material outwardly through the grooves as the ring passes thereover.

The casting of the hollow sheave necessarily leaves a certain amount of sand, and other foreign matter, on the interior thereof. The lubricating material within the chamber loosens the sand, or other material, from the interior of the chamber, and in the absence of the ring would find its way to the bearing surface and injure the bearing. The ring made in accordance with my invention acts as a dam or filter to prevent the sand, or other foreign material in the lubricant, from reaching the bearing.

Anti-friction thrust washers 31 are preferably provided between the hub of the sheave and the side plates 10, as indicated in Fig. 3.

What we claim and desire to secure by Letters Patent of the United States is:

1. In a sheave block, a bearing member, a sheave having a bearing aperture surrounding said member and provided with a chamber adapted to contain lubricating material and an annular passage leading from said chamber to said bearing member, the width of the inner portion of said annular passage being greater than the outer portion thereof, and a ring formed of resilient fibrous material located in said passage for conveying lubricating material from said chamber to said bearing member.

2. In a sheave block, a cylindrical bearing member, a sheave having a cylindrical bearing aperture surrounding said member and provided with a chamber adapted to contain lubricating material and an annular passage enlarged inwardly leading from said chamber to said bearing member, and a ring formed of resilient fibrous material located in said passage for conveying lubricating material from said chamber to said bearing member.

3. In a sheave block, a cylindrical bearing member, a sheave having a cylindrical bearing aperture surrounding said member and provided with a chamber adapted to contain lubricating material and an inwardly enlarged annular passage leading from said chamber to said bearing member, and a felt ring compressed within said passage for conveying lubricating material from said chamber to said bearing member.

ERVIN D. SWAN.
DUFF G. MANGES.